(12) United States Patent
Lee

(10) Patent No.: US 7,815,139 B2
(45) Date of Patent: Oct. 19, 2010

(54) FLY REEL

(75) Inventor: Jae Koo Lee, Kyungki-do (KR)

(73) Assignee: Juho Corporation, Kyungki-Do (KR)

( * ) Notice: Subject to any disclaimer, the term of this patent is extended or adjusted under 35 U.S.C. 154(b) by 0 days.

(21) Appl. No.: 12/518,277

(22) PCT Filed: Dec. 7, 2007

(86) PCT No.: PCT/KR2007/006362

§ 371 (c)(1),
(2), (4) Date: Jun. 9, 2009

(87) PCT Pub. No.: WO2008/072860

PCT Pub. Date: Jun. 19, 2008

(65) Prior Publication Data

US 2010/0025513 A1 Feb. 4, 2010

(30) Foreign Application Priority Data

Dec. 13, 2006 (KR) .................. 10-2006-0126770

(51) Int. Cl.
*A01K 89/016* (2006.01)
*A01K 89/033* (2006.01)
(52) U.S. Cl. .................. 242/303; 242/295; 242/246
(58) Field of Classification Search .................. 242/295, 242/298, 302, 303, 317, 318, 246
See application file for complete search history.

(56) References Cited

U.S. PATENT DOCUMENTS

| 4,515,325 | A | * | 5/1985 | Ito | 242/295 |
| 4,657,201 | A | * | 4/1987 | Munroe | 242/265 |
| 5,407,144 | A | * | 4/1995 | Ryall | 242/295 |
| 6,073,871 | A | * | 6/2000 | Farris et al. | 242/295 |
| 6,209,815 | B1 | * | 4/2001 | Collier | 242/303 |
| 6,286,772 | B1 | * | 9/2001 | Koelewyn | 242/246 |
| 6,354,526 | B1 | * | 3/2002 | Morise | 242/295 |
| 6,382,544 | B1 | * | 5/2002 | Park | 242/303 |

(Continued)

FOREIGN PATENT DOCUMENTS

JP 09-051745 2/1997

(Continued)

*Primary Examiner*—Evan H Langdon
(74) *Attorney, Agent, or Firm*—Mark M. Friedman

(57) ABSTRACT

A fly reel is disclosed, which comprises an improved drag apparatus which includes a drag knob which is rotatably engaged to an outer side of the center shaft; a drag spindle which is spaced apart from the drag knob and is rotatably inserted into an outer side of the center shaft; a braking member which is limits a rotation of the drag spindle on the center shaft depending on a movement that the drag knob moves in an axial direction of the center shaft; an one-way bearing which is inserted into an outer side of the drag spindle and in which one direction rotation of the same is permitted, and the other direction rotation of the same is not permitted; and a drag cover which is rotatably inserted into an outer side of the center shaft and rotates by a rotation operation of the spool and allows the one-way bearing to rotate when the spool rotates, wherein the center shaft includes a flange provided on an outer side of the same for limiting an axial direction movement of the drag spindle.

4 Claims, 5 Drawing Sheets

U.S. PATENT DOCUMENTS

| | | | |
|---|---|---|---|
| 6,550,709 B2 * | 4/2003 | Vashro | 242/295 |
| 7,077,350 B2 * | 7/2006 | Koelewyn | 242/295 |
| 7,168,647 B1 * | 1/2007 | Kang | 242/303 |
| 7,431,232 B1 * | 10/2008 | Kang | 242/303 |

FOREIGN PATENT DOCUMENTS

| | | |
|---|---|---|
| JP | 10-066489 | 3/1998 |
| KR | 1020040065842 | 7/2004 |
| KR | 1020060125205 | 12/2006 |

\* cited by examiner

FLY REEL

TECHNICAL FIELD

The present invention relates to a fly reel, and in particular to a fly reel in which a spool is detachably installed in a frame, and a simple drag apparatus is adapted for adjusting a rotation speed of a spool for thereby enhancing productivity.

BACKGROUND ART

The conventional fly reel includes a spool for winding or unwinding a fishing line, a frame for rotatably supporting the spool, and a drag apparatus for adjusting a rotation speed of the spool. As a handle attached at one side of the spool is rotated, a fishing line is fast wound on the spool. On the contrary, the speed that a fishing line is unwound from the spool can be adjusted by means of the drag apparatus.

So far, various kinds of fly reels are currently commercialized. However, the conventional fly reels have been developed while just simply improving a connection structure of a spool and a frame, a drag apparatus for adjusting a rotation speed of a spool, a structure on a function switch for switching a rotation direction of a spool, and a structure on a generation or prevention apparatus of a rotation or drag sound of a spool. Since the above apparatuses are not efficiently arranged in a small space of a frame or a spool while interacting with one another, the structures of the same are so complicated, and the productivity is decreased.

In addition, in case that an one-way bearing or a ratchet gear is installed in the interior of the spool or the frame for switching a drag direction, when a user wants to change an engaging direction of an one-way bearing or a ratchet gear when it is needed, the drag apparatus is first disassembled, and the bearing or ratchet gear is upside down and is inserted into the apparatus. So, the assembling and disassembling processes are complicated, and the direction switch of the drag is not easy. In the course of switching the engaging direction, moisture may be inputted into a mechanical structure, so that corrosion occurs in a shaft support part. A washer or snap ring may be popped out owing to its elastic force during a part exchange work and may be lost. So, the reel may not be used at a fishing place.

DISCLOSURE OF THE INVENTION

Technical Problem

It is an object of the present invention to provide a fly reel in which a spool is detachably engaged in a frame, and a simply drag construction is provided for adjusting a rotation speed of a spool, and a reliable drag operation is obtained, and productivity is enhanced, and a manufacture cost of a reel is lowered.

It is another object of the present invention to provide a fly reel in which an engaging direction of an one-way bearing provided in a drag apparatus can be easily switched without losing related parts, and it is possible to prevent moisture from inputted into the interior of a drag apparatus by means of a simple structure.

Technical Solution

To achieve the above objects, in a fly reel which includes a frame having a hub at its center portion, a center shaft fixedly engaged to the hub of the frame, a spool which is rotatably engaged to the center shaft for winding or unwinding a fishing line, and a drag apparatus which is engaged to the center shaft for controlling a rotation speed of the spool, there is provided a fly reel which comprises an improved drag apparatus which includes a drag knob which is rotatably engaged to an outer side of the center shaft; a drag spindle which is spaced apart from the drag knob and is rotatably inserted into an outer side of the center shaft; a braking member which is limits a rotation of the drag spindle on the center shaft depending on a movement that the drag knob moves in an axial direction of the center shaft; an one-way bearing which is inserted into an outer side of the drag spindle and in which one direction rotation of the same is permitted, and the other direction rotation of the same is not permitted; and a drag cover which is rotatably inserted into an outer side of the center shaft and rotates by a rotation operation of the spool and allows the one-way bearing to rotate when the spool rotates, wherein the center shaft includes a flange provided on an outer side of the same for limiting an axial direction movement of the drag spindle.

The drag spindle includes a first part formed on an outer side of the same for inserting the one-way bearing, and a second part which is formed near the first part and has a concave groove formed along its surrounding portion for inserting an O-ring.

The drag cover includes a first extension part and a second extension part which are extended in axial directions, respectively, with respect to an angular part formed in an inner side of the same, and the angular part is inserted in such a manner that an angular formed on an outer side of the one-way bearing corresponds thereto, and the first extension part has a protrusion formed along a surrounding portion of the same for pressurizing the O-ring inserted into the concave groove formed in the first part of the drag spindle, and the second extension part has a concave groove for inserting an O-ring for contacting with the flange formed in an outer side of the center shaft along its surrounding portion.

The braking member includes a plurality of pushballs which are inserted into the hub of the frame and move in an axial direction of the center shaft by receiving a movement force generated as the drag knob moves in an axial direction; a push plate which is inserted into an outer side of the center shaft and moves in an axial direction of the center shaft by receiving a movement force generated as the pushballs move in an axial direction of the center shaft; a compression ring which is inserted into an outer side of the center shaft and is compressed in an axial direction of the center shaft by receiving a movement force generated as the pushballs move in an axial direction of the center shaft; a pressure plate which is inserted into an outer side of the center shaft while being movable in an axial direction of the center shaft and receives a compressed force of the compression ring; a drag washer which is inserted into an outer side of the center shaft while being movable in an axial direction of the center shaft and receives a force applied from the pressure plate; and a friction plate which is inserted into an outer side of the center shaft while being rotatably near the drag washer and receives a force applied from the drag washer and cooperates along with the drag spindle.

Advantageous Effect

In the fly reel according to the present invention, a spool is easily detachably from a frame, and a simple drag apparatus is provided for easily adjusting a rotation speed of a spool. A reliable accurate drag control is possible, and productivity is enhanced. The manufacture cost is decreased. An engaging direction of an one-way bearing installed in a drag apparatus can be easily switched without loosing related parts, and it is possible to prevent moisture from inputting into the interior of a drag apparatus with a simple structure.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

The fly reel according to a preferred embodiment of the present invention will be described with reference to the accompanying drawings.

Figure 1:
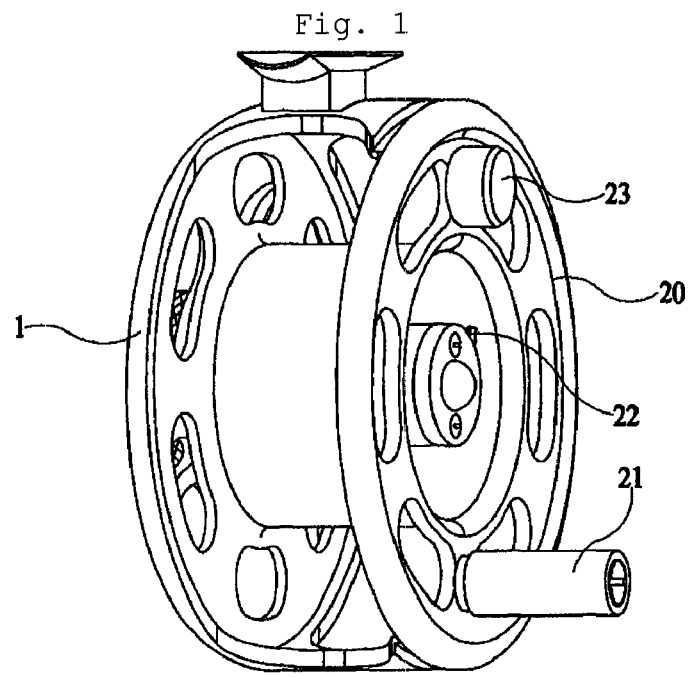
FIG. 1 is a perspective view illustrating a fly reel according to the present invention.
Figure 2:
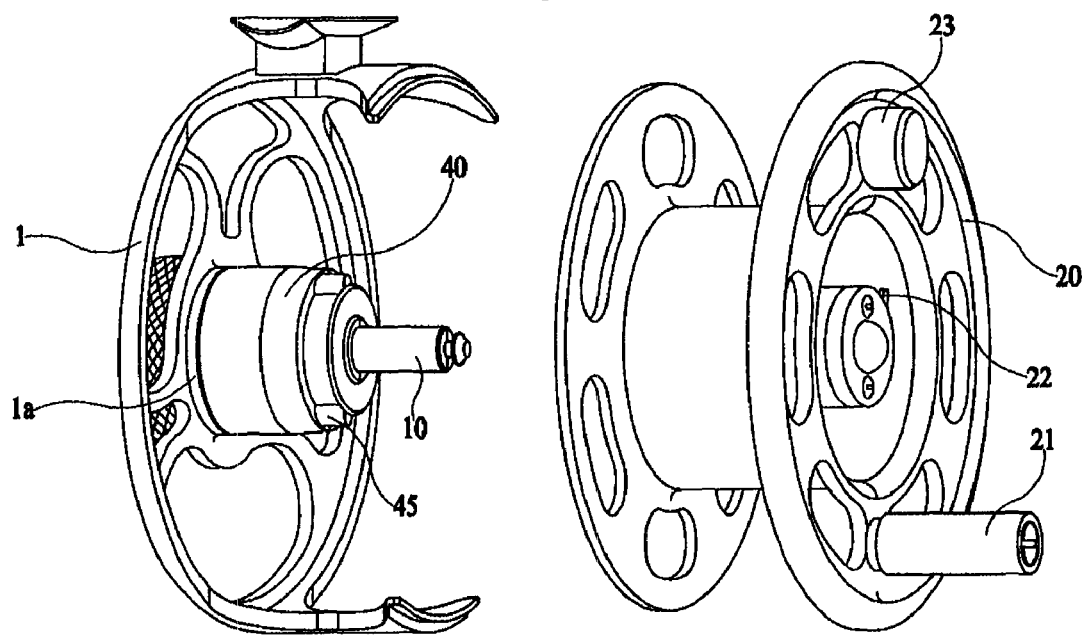
FIG. 2 is a disassembled view illustrating a state that a spool of a fly reel is disassembled from a frame according to the present invention.

As shown in FIGS. 1 and 2, the fly reel according to the present invention comprises a frame 1 having a hub 1a at its center portion, a center shaft 10 fixed in the hub 1a of the frame 1, a spool 20 which is rotatably engaged to the center shaft 10 for winging or unwinding a fishing line, and a drag apparatus which is engaged to the center shaft 10 for adjusting a rotation speed of the spool 20.

Figure 3:
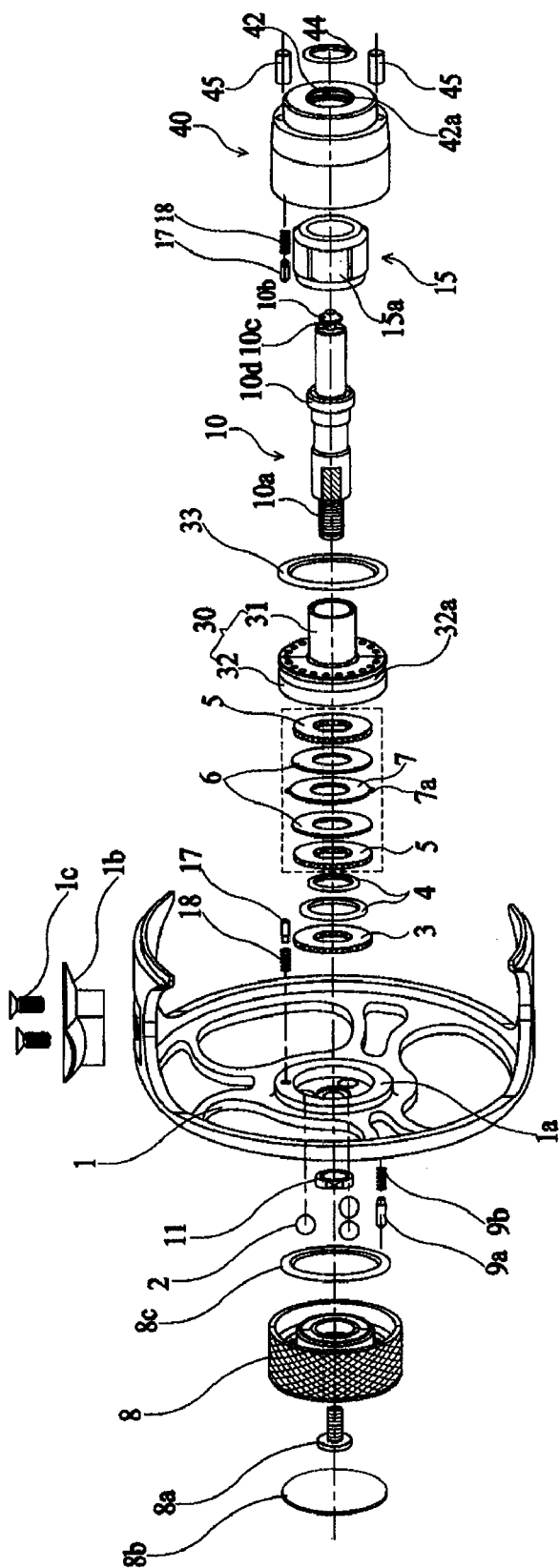
FIG. 3 is a disassembled perspective view illustrating a frame and a drag apparatus of a fly reel according to the present invention.
Figure 4:
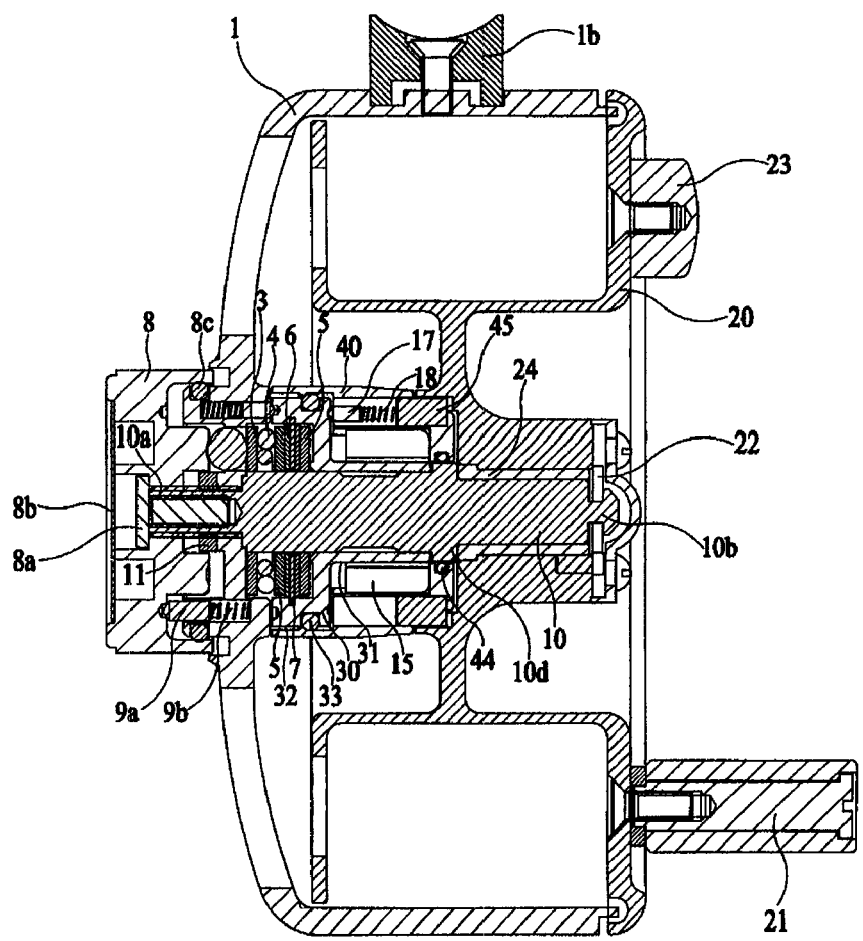
FIG. 4 is a cross sectional view illustrating a fly reel according to the present invention.

As shown in FIGS. 3 and 4, the center shaft 10 includes a thread part 10a formed on an outer surface of one side of the same, a head part 10b formed on an outer surface of the other side of the same, and a neck part 10c having a diameter smaller than the head part 10b for thereby forming an engaging groove. A flange 10d is provided in the intermediate portion for limiting an axial movement of a drag spindle 30.

A nut 11 is engaged to the thread part 10a for fixedly engaging the center shaft 10 to the hub 1a formed at a center portion of the frame 1, and a spool attaching and detaching lever 22 of the spool 20 is inserted into the engaging groove and is rotatably engaged on the center shaft 10.

As shown in FIGS. 2 and 4, the spool 20 includes a shaft hole formed at a center portion for inserting the center shaft 10, and a handle 21 is formed at one side of the same for winding or unwinding a fishing line. When the spool 20 is disassemble from and assemble to the frame 1, it is possible to easily assemble or disassemble by using the spool attaching and detaching lever 22 formed at one side of the spool 20. In the drawings, reference numeral 23 represents a balance, and 24 represents a bushing.

The drag apparatus is engaged to the center shaft 10 for adjusting or limiting a rotation speed of the spool 20. As shown in FIGS. 3 and 4, the drag apparatus includes a drag knob 8, a drag spindle 30, a braking member, an one-way bearing 15, and a drag cover 40.

The drag knob 8 is rotatably thread-engaged to the thread part 10a formed on one side of the center shaft 10. When the drag knob 8 rotates, the pushballs 2 inserted into the hub 1a of the frame 1 move in an axial direction of the center shaft 10. In the drawings, reference numeral 8b represents a drag knob cover, 8c represents an O-ring, 9a represents a drag knob clicker, and 9b represents a spring.

Here, the drag spindle 30 is rotatably inserted into an outer side of the center shaft 10 positioned at one side of the hub 1a formed at a center portion of the frame 1 while keeping spaced apart from the drag knob 8. The rotation of the drag spindle 30 on the center shaft 10 is controlled depending on a braking operation of the braking member. The outer surface of the same is formed of a first part 31 in which the one-way bearing 15 is inserted, and a second part 32 which is formed near the first part 31 and has a concave groove part 32a in which the O-ring 33 is inserted along a circumferential side of the same. A groove is formed at an inner side of the same for inserting a protrusion 7a protruded from an outer side of a friction plate 7 which will be described later. In the drawings, reference numeral 17 represents a clicker, and 18 represents a clicker spring.

The braking member is provided for limiting the rotation of the drag spindle 30 on the center shaft 10 depending on a movement degree that the drag knob 8 moves in an axial direction of the center shaft 10. As shown in FIGS. 3 and 4, the braking member is formed of a plurality of pushballs 2, a push plate 3, a compression ring 4, a pressure plate 5, a drag washer 6, and a friction plate 7.

Here, the pushballs 2 are inserted into the hub 1a of the frame 1 and move in an axial direction of the center shaft 10 by receiving a movement force generated as the drag knob 8 moves in an axial direction.

The push plate 3 is movably inserted into an outer side of the center shaft 10 while being movable in an axial direction of the center shaft 10 and has a hole at its center portion, and moves in an axial direction of the center shaft 10 by receiving a movement force generated as the push balls 2 move in an axial direction of the center shaft 10.

The compression ring 4 is movably inserted into an outer side of the center shaft 10 while being movable in an axial direction of the center shaft 10 and has a hole in its center portion, and is compressed in an axial direction of the center shaft 10 by receiving a movement force generated as the push plate 3 moves in an axial direction of the center shaft 10.

The pressure plate 5 has a hole at its center portion so that it can be movably inserted into an outer side of the center shaft 10 in an axial direction of the center shaft 10. The force generated as the compression ring 4 is compressed is transferred to the drag washer 6.

The drag washer 6 has a hole at its center portion, so that it is movably inserted into an outer side of the center shaft 10 in an axial direction of the center shaft 10 while being positioned near the friction plate 7 which will be described later. The force from the pressure plate 5 is transferred to the friction plate 7.

The friction plate 7 has a hole at its center portion with a diameter larger than an outer diameter of the center shaft 10, so that it is rotatable in an outer side of the center shaft 10. A protrusion 7a is formed on its outer upper and lower sides for thereby being rotatable along with the drag spindle 30 when the drag spindle 30 rotates.

The braking member may be implemented in various forms for substantially supporting the rotation of the drag spindle on the center shaft including the above-described constructions.

Figure 7:
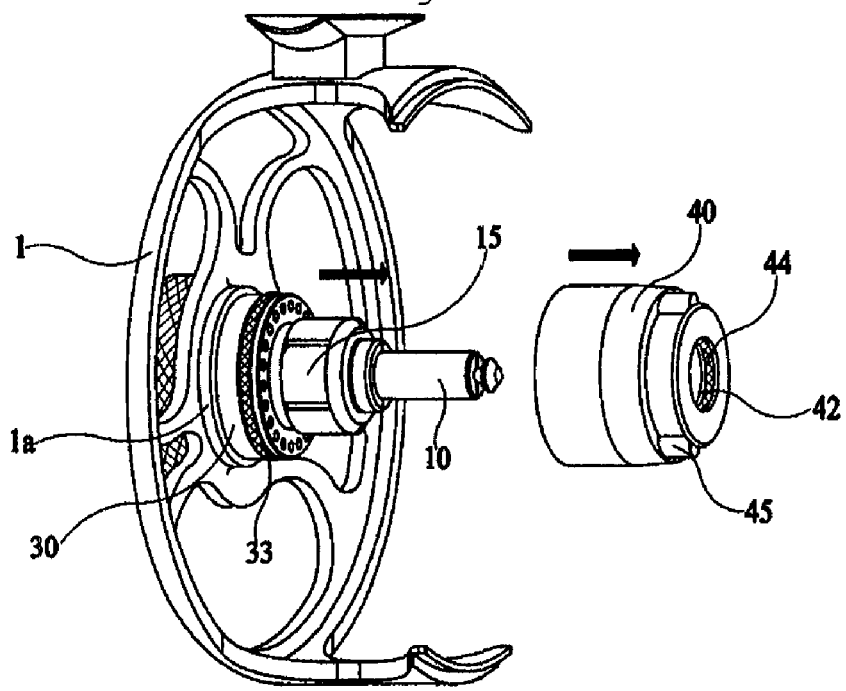
FIG. 7 is a view for describing a drag direction switch of a fly reel according to the present invention.

As shown in FIGS. 3, 4 and 7, the one-way bearing 15 is inserted into an outer side of the drag spindle 30 and is rotatable in one direction, but is not rotatable in the opposite direction. An angular part 15a is formed on its outer side for allowing the drag cover 40 to rotate together.

When the engaging direction of the one-way bearing 15 is changed on the outer side of the drag spindle 30, a rotation permission direction and a limitation direction of the one-way bearing 15 is changed.

The drag cover 40 is rotatably inserted into an outer side of the center shaft 10 and rotates depending on a rotation operation of the spool 20. An angular part corresponding to the angular part 15a formed on an outer side of the one-way bearing 15 is formed in the interior of the same so that the one-way bearing 15 rotates when the spool 20 rotates.

The drag cover 40 is formed of a first extension part 41 and a second extension part 42 which are extended in the axial directions, respectively, with respect to the angular part formed on its outer side so that the drag spindle 30 and the one-way bearing 15 are not exposed to the outside.

A protrusion shoulder 41a is formed along a circumferential side of the first extension part 41 for pressurizing the O-ring 33 inserted into the concave groove 32a formed in the first part 31 of the drag spindle 30. The second extension part 42 is formed of a concave groove 42a formed along its circumferential side for inserting the O-ring 44 therein for contacting with the flange 10d formed in an outer side of the center shaft 10. In the drawings, reference numeral 17 represents a clicker, 18 represents a clicker spring, 1b represents a base plate, and 1c represents a base plate screw.

Figure 5:
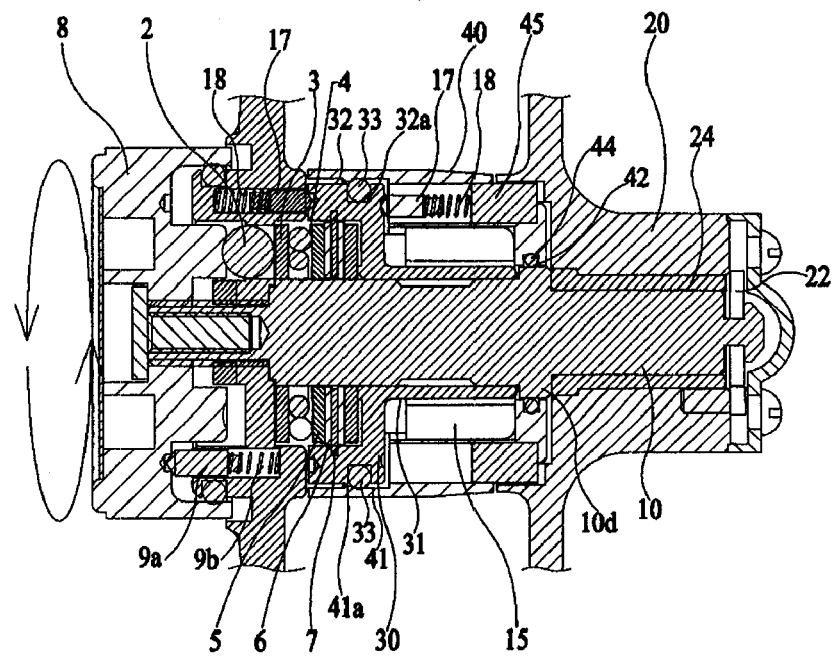
FIG. 5 is a cross sectional view illustrating a state before a drag operation of a fly reel is performed according to the present invention.

In the fly reel according to the present invention, as shown in FIG. 5, since the drag knob 8 engaged in one side of the frame 1 keeps fully loosened in a counterclockwise direction before a drag operation is applied to the drag spindle 30, the fly reel keeps moved in a left direction when viewing the same in an axial direction of the center shaft 10. In this state, any external force is not applied to the pushball 2, so that the pushball 2 stays in the left side. So, since any external force is not applied to the neighboring braking member, namely, the push plate 3, the compression ring 4, the pressure plate 5, the drag washer 6 and the friction plate 7, the friction plate 7 becomes a state that the rotation in either the clockwise direction or the counterclockwise direction is free. So, the drag spindle 30 engaged by means of the protrusion 7a formed on an outer side of the friction plate 7 becomes a free rotation state on the center shaft 10 in either the clockwise direction or the counterclockwise direction.

The one-way bearing 15 is inserted into the outer side of the drag spindle 30, and the rotation of the one-way bearing 15 is free in one direction on the outer side of the drag spindle 30, but is limited in the other direction on the same.

In this state, when a user rotates the spool 20 in a direction that the one-way baring 14 can freely rotate, the spool 20 and the drag cover 40 cooperate with the help of the key pin 25. Since the drag cover 40 and the one-way bearing 15 keep engaged with the help of the engagement of the angular part, when the spool 20 is rotated, the spool 20 can freely rotate through the drag cover 40 while freely rotating the one-way bearing 15 without some resistance. When the user rotates the spool 20 in a direction that the rotation of the one-way bearing 15 is limited, the rotational force of the spool 20 allows the one-way bearing 15 to rotate. Even when the rotation of the one-way bearing 15 is limited on the outer side of the drag spindle 30, since a rotational force larger than the limiting force of the same is applied to the one-way bearing 15 by means of the force which rotates the spool 20, the force, which rotates the spool 20, can be applied to the drag spindle 30 beyond the rotation limitation force of the one-way bearing 15, so that the drag spindle 30 rotates, and the spool 20 can rotate on the center shaft 10.

So, even when the user rotates the spool 20 in the left or right direction, it is possible for the user to freely rotate the spool 20 in a desired direction before the drag force is applied to the drag spindle 30.

Figure 6:
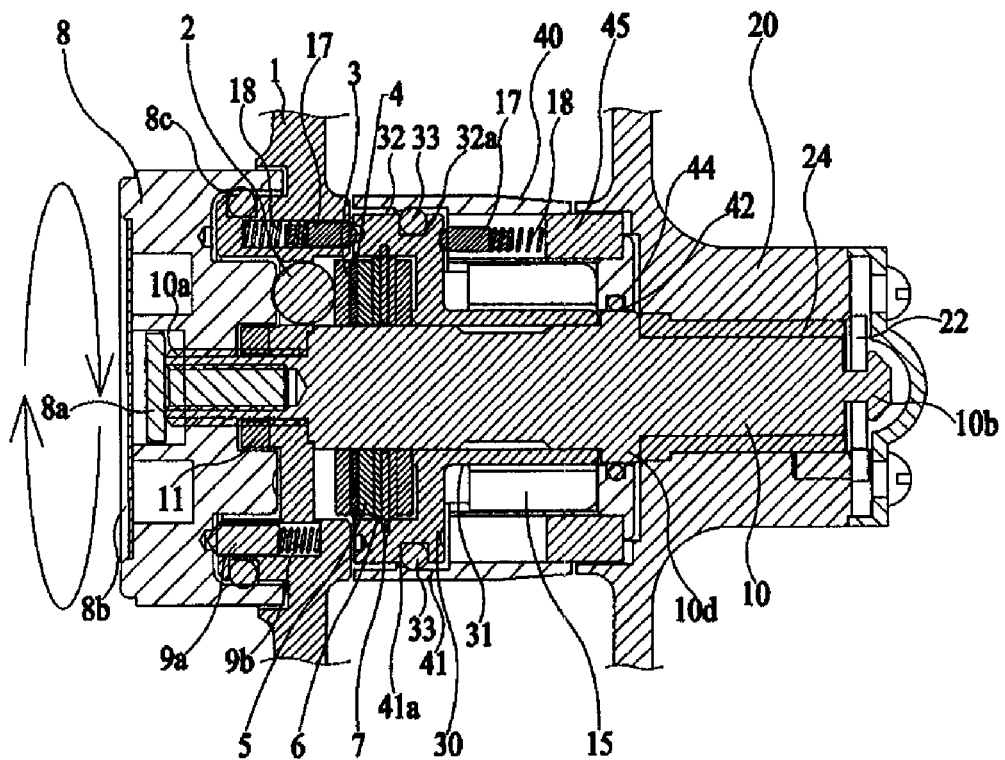
FIG. 6 is a cross sectional view illustrating a state after a drag operation of a fly reel is performed according to the present invention.

In this state, as shown in FIG. 6, when the user rotates the drag knob 8 in the clockwise direction, the drag knob 8 moves in the right direction on the center shaft 10 and pressurizes the pushball 2 in the right direction, and the pressurizing force is transferred to the push plate 3, and the push plate 3 compresses the compression ring 4. The compressed compression ring 4 transfers force to the pressure plate 5, and compresses the friction plate 7 with the drag washer 6 being disposed between the same. When the drag knob 8 rotates in the clockwise direction, it is possible to control the rotation of the friction plate 7, and it is possible to control the rotation of the drag spindle 30 on the center shaft 10 with the drag spindle 30 being engaged to the friction plate 7.

The one-way bearing 15 is inserted into an outer side of the drag spindle 30. The rotation of the one-way bearing 15 is free in one direction on an outer side of the drag spindle 30, but is limited in the opposite direction.

In this state, when a user rotates the spool 20 in a direction that the rotation of the one-way bearing 15 is free, when the drag cover 40 operating along with the spool 20 rotates, the one-way bearing 15 inserted into the angular part formed in the interior of the drag cover 40 freely rotates on an outer side of the drag spindle 30, and the spool 20 freely rotates. On the contrary, when the user rotates the spool 20 in the direction that the one-way bearing 15 is not freely rotated, since the rotation of the drag cover 40 engaged with the spool 20 is limited by means of the one-way bearing 15, the rotation of the spool 20 is limited on the center shaft 10.

The rotation of the spool 10 is free in one direction after the drag force is applied to the drag spindle 30, but the rotation of the spool 10 in the opposite direction is limited depending on the degree that the drag force is applied.

Since the rotation permission direction of the one-way bearing 15 changes depending on the direction that it is inserted into the drag spindle 30, in case that the user is a left-handed person, the left direction rotation of the one-way bearing 15 is always free, and when the drag force is not applied, the right direction rotation is free, and when the drag force is applied, the rotation is inhibited or restricted. In case that the user is a right-handed person, the right direction rotation of the one-way bearing 15 is always free, and when the drag force is not applied, the right direction rotation is free, and when the drag force is applied, the rotation is inhibited or limited.

Figure 8:
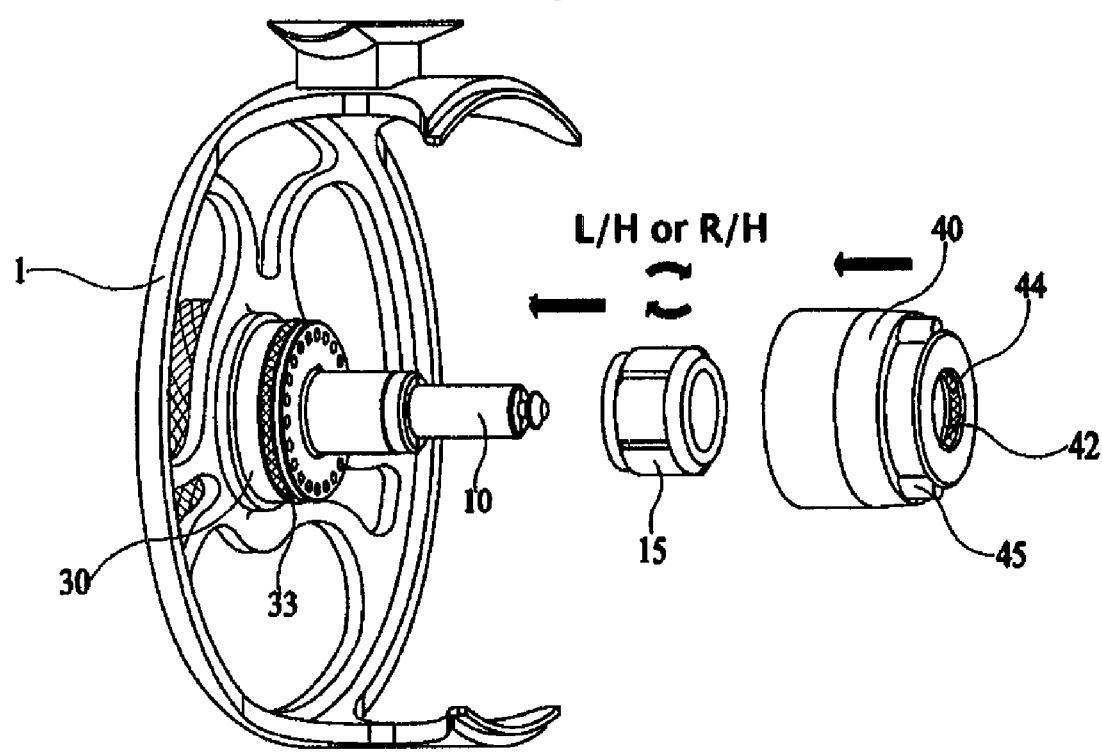
FIG. 8 is a view for describing another direction switch of a fly reel according to the present invention.

So, when it is needed to change the drag direction depending on the rotation direction of the spool 20, as shown in FIG. 1, the spool attaching and detaching lever 22 of the spool 20 is pushed in one side, and as shown in FIG. 2, the spool 20 is separated from the frame 1, and as shown in FIG. 7, the outer side of the drag cover 40 is held by hands, and force is applied in the arrow direction of FIG. 7. So, even though the drag cover 40 is separated from the outer side of the drag spindle 30 without applying force using a certain tool, and the one-way bearing 15 inserted into the outer side of the drag spindle 30 is exposed. In this state, the one-way bearing 15 is disengaged from the drag spindle 30, and the engaging direction is changed, and as shown in FIG. 8, it is engaged to an outer side of the drag spindle 30 in the reverse sequence. So, it is possible to easily switch the direction of the drag depending on the rotation direction of the spool 20 irrespective of the user who is a left-hander person or a right-handed person.

In the drag cover 40, the O-ring 44 is inserted into the concave groove 42a of the second extension part 42 for contacting with the flange 10d, and the O-ring 33 is inserted into the concave groove 32a formed in the second extension part 32 of the drag spindle 30. So, when the drag cover 40 is inserted into the drag spindle 30, it is possible to easily prevent external moisture from inputted into the interior of the drag cover 40 with the help of the O-rings 33 and 44. When it is needed to engage the drag cover 40 to the drag spindle 30, since it is engaged as the inner wall of the drag cover 40 pressurizes the O-ring 33, it is easy to engage the drag cover 40 to the drag spindle 30 without using a certain engaging member.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

In the fly reel according to the present invention, it is possible to easily attach or detach the spool to/from the frame. A simple drag apparatus is provided for adjusting a rotation speed of the spool. A reliable accurate control of the drag is obtained, and the productivity is enhanced. The manufacture cost is decreased.

What is claimed is:

1. In a fly reel which includes a frame (1) having a hub (1a) at its center portion, a center shaft (10) fixedly engaged to the hub (1a) of the frame (1), a spool (20) which is rotatably engaged to the center shaft (10) for winding or unwinding a fishing line, and a drag apparatus which is engaged to the center shaft (10) for controlling a rotation speed of the spool, the fly reel, comprising:

a drag apparatus which includes:

a drag knob (8) which is rotatably engaged to an outer side of the centershaft (10);

a drag spindle (30) which is spaced apart from the drag knob (8) and is rotatably inserted around an outer side of the center shaft (10);

a braking means which limits a rotation of the drag spindle (30) on the center shaft (10) depending on a movement that the drag knob (8) moves in an axial direction of the center shaft (10);

an one-way bearing (15) which is inserted around an outer side of the drag spindle (30) and in which one direction rotation of the one-way bearing is permitted, and the other direction rotation of the one is not permitted; and a drag cover (40) which is rotatably inserted around and can be disengaged from an outer side of the drag spindle (30), and which allows the one-way bearing (15) to rotate when the spool (20) rotates, wherein said center shaft (10) includes a flange 10d provided on an outer side of the center shaft for limiting an axial direction movement of the drag spindle (30), wherein the spool has a central recess for receiving the drag cover.

2. The reel of claim 1, wherein said drag spindle (30) includes a first part (31) formed on an outer side of the drag spindle to insert the one-way bearing (15) around the first part (31), and a second part (32) which is formed near the first part (31) and has a concave groove (32) a formed along its surrounding portion for inserting an O-ring (32a).

3. The reel of claim 1, wherein said drag cover (40) includes a first extension part (41) and a second extension part (42) which are extended in axial directions, respectively, with respect to an angular part formed in an inner side of the drag cover, and said angular part is inserted in the manner that an angular (15a) a formed on an outer side of the one-way bearing (l5a) corresponds thereto, and said first extension part (41) has a protrusion (41a) formed along a surrounding portion of the same for pressurizing the O-ring 33 inserted into the concave groove (32a) formed in the first part (31) of the drag spindle (30), and said second extension part (42) has a concave groove (42a) a for inserting an O-ring (44) for contacting with the flange (10d) formed in an outer side of the center shaft (10) along its surrounding portion.

4. The reel of claim 1, wherein said braking means includes: a plurality of pushballs (2) which are inserted into the hub (1a) of the frame (1) and move in an axial direction of the center shaft (10) by receiving a movement force generated as the drag knob (8) moves in an axial direction;

a push plate (3) which is inserted around an outer side of the center shaft (10) and moves in an axial direction of the center shaft (10) by receiving a movement force generated as the pushballs (2) move in an axial direction of the center shaft (10);

a compression ring (4) which is inserted around an outer side of the center shaft (10) and is compressed in an axial direction of the center shaft 10 by receiving a movement force generated as the pushballs (3) move in an axial direction of the center shaft (10);

a pressure plate (5) which is inserted around an outer side of the center shaft (10) while being movable in an axial direction of the center shaft (10) and receives a compressed force of the compression ring (4);

a drag washer (6) which is inserted around an outer side of the center shaft (10) while being movable in an axial direction of the center shaft (10) and receives a force applied from the pressure plate (5); and a friction plate (7) which is inserted around an outer side of the center shaft (10) while being rotatably near the drag washer (6) and receives a force applied from the drag washer (6) and cooperates along with the drag spindle.

* * * * *